(12) United States Patent
Simler et al.

(10) Patent No.: US 8,879,591 B2
(45) Date of Patent: Nov. 4, 2014

(54) APPARATUS, METHOD, AND COMPUTER PROGRAM PRODUCT FOR CONTROLLING LASER WAVELENGTH STABILITY

(75) Inventors: Thomas Paul Simler, Morrisdale, PA (US); Charles Jay Pifer, Pleasant Gap, PA (US); Robert Allen Shincovich, Irwin, PA (US)

(73) Assignee: ARRIS Solutions, Inc., Suwanee, GA (US)

( * ) Notice: Subject to any disclaimer, the term of this patent is extended or adjusted under 35 U.S.C. 154(b) by 900 days.

(21) Appl. No.: 11/237,846

(22) Filed: Sep. 29, 2005

(65) Prior Publication Data

US 2006/0067372 A1    Mar. 30, 2006

Related U.S. Application Data

(60) Provisional application No. 60/613,756, filed on Sep. 29, 2004.

(51) Int. Cl.
*H01S 3/04* (2006.01)
*H01S 3/131* (2006.01)
*H01S 3/102* (2006.01)

(52) U.S. Cl.
CPC ............ *H01S 3/102* (2013.01); *H01S 3/1028* (2013.01); *H01S 3/131* (2013.01); *H01S 3/1317* (2013.01)
USPC .............................................. 372/34; 372/20

(58) Field of Classification Search
USPC ........................................ 372/32, 34; 398/34
See application file for complete search history.

(56) References Cited

U.S. PATENT DOCUMENTS

| | | | | |
|---|---|---|---|---|
| 4,817,098 A | * | 3/1989 | Horikawa | 372/34 |
| 4,922,480 A | * | 5/1990 | Bosch | 398/196 |
| 5,014,278 A | | 5/1991 | Deki | |
| 5,212,707 A | * | 5/1993 | Heidel et al. | 372/50.23 |
| 5,506,854 A | | 4/1996 | Basu | |
| 6,219,362 B1 | | 4/2001 | Hillmer et al. | |
| 6,291,813 B1 | * | 9/2001 | Ackerman et al. | 250/214 R |
| 6,525,550 B2 | * | 2/2003 | Pan | 324/721 |
| 6,546,031 B1 | * | 4/2003 | Jewell et al. | 372/45.01 |
| 6,792,015 B1 | * | 9/2004 | Theodoras et al. | 372/34 |

(Continued)

OTHER PUBLICATIONS

D. B. Young et al., "Enhanced Performance of Offset-Gain High-Barrier Vertical-Cavity Surface-Emitting Lasers", IEEE Journal of Quantum Electronics, vol. 29, No. 6., pp. 2013-2021.*

(Continued)

*Primary Examiner* — Xinning Niu
(74) *Attorney, Agent, or Firm* — Troy A. Van Aacken

(57) ABSTRACT

An apparatus includes a laser that generates a predetermined wavelength when the laser operates at room temperature, the predetermined wavelength being offset from a specific wavelength. The laser has a controlled wavelength range due to a wavelength drift, the wavelength range having a first wavelength as the upper boundary and a second wavelength as the lower boundary, the first wavelength is generated when the laser operates at a first temperature of an ambient and the second wavelength is generated when the laser operates at a predetermined temperature higher than a second temperature of the ambient. The apparatus includes a heater that heats the laser such that a wavelength in the controlled wavelength range that is generated by the laser when heated by the heater from the second temperature is longer than a short wavelength that is generated by the laser centered on the specific wavelength that operates at the second temperature; and a control circuit configured to turn on the heater.

9 Claims, 12 Drawing Sheets

(56) References Cited

U.S. PATENT DOCUMENTS

| | | | |
|---|---|---|---|
| 2001/0036210 A1* | 11/2001 | Salomaa | 372/32 |
| 2002/0037129 A1* | 3/2002 | Brinkman et al. | 385/16 |
| 2003/0123496 A1* | 7/2003 | Broutin et al. | 372/20 |
| 2004/0114646 A1* | 6/2004 | Stewart et al. | 372/34 |

OTHER PUBLICATIONS

H. Nishimoto, M. Yamaguchi, I. Mito, and K. Kobayashi, "High frequency response for DFB LD due to a wavelength detuning effect," J. Lightwwave Technol., vol. LT-5, No. 10, pp. 1399-1402, Oct. 1987.*

Sajjad Hussain et al., "CWDM and OEO Transport Architectures", IEE Conference Publication "Future Challenges and Opportunities for DWDM and CWDM in the Photonic Networks", IEE Midlands Communications Group, Jun. 11, 2004.

David R. Goff, "Fiber Optic Video Transmission—The Complete Guide", Front cover, p. 254-257, Focal Press, 2003.

* cited by examiner

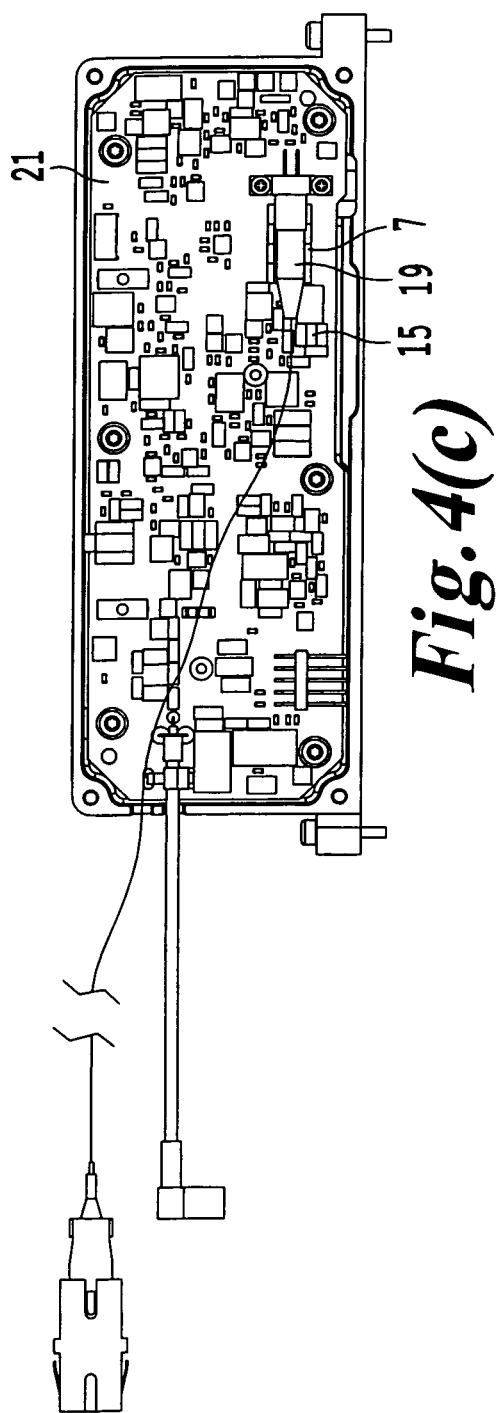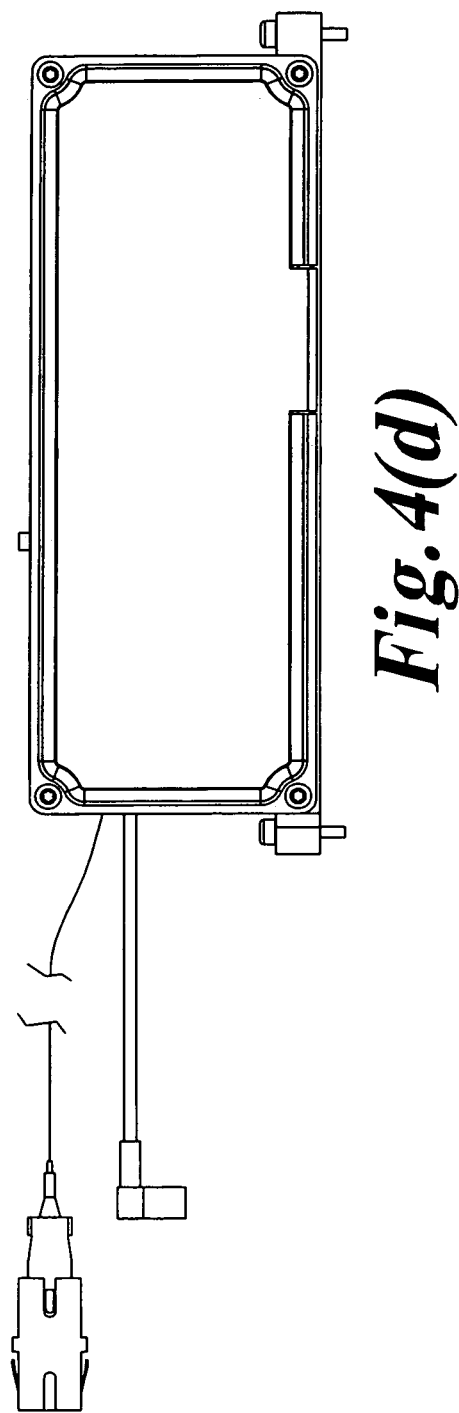

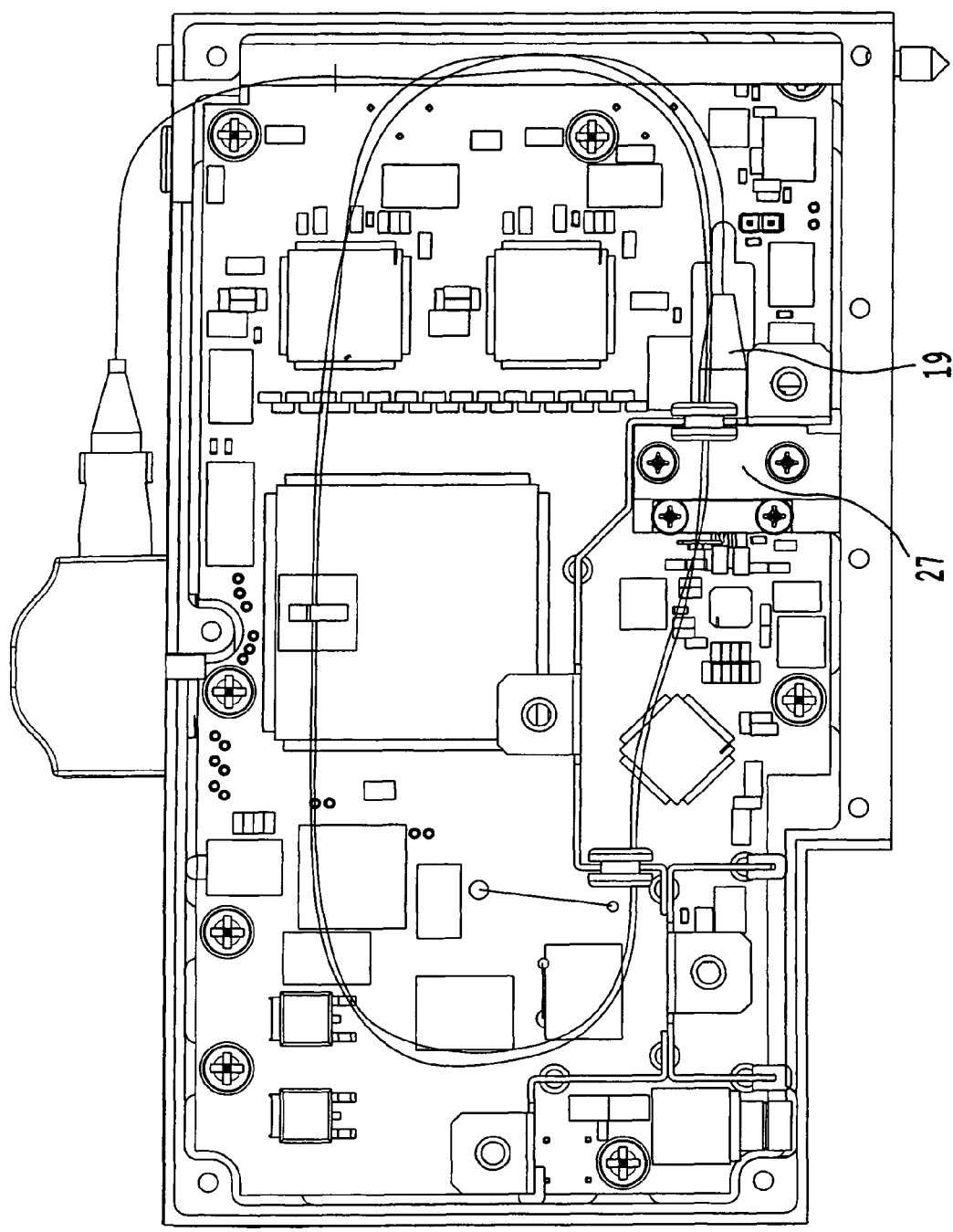

APPARATUS, METHOD, AND COMPUTER PROGRAM PRODUCT FOR CONTROLLING LASER WAVELENGTH STABILITY

BACKGROUND OF THE INVENTION

1. Field of the Invention

An apparatus includes a laser offset in wavelength from a specific wavelength and a heater that maintains the laser wavelength in a required range over a wide temperature variation.

2. Discussion of the Related Art

Wavelength Division Multiplexing (WDM) is a technology that funnels wavelengths from different sources at different bit rates and different protocols (such as Fiber Channel, Ethernet and Asynchronous Transfer Mode (ATM)) onto an optical fiber.

Each data channel, or signal, is carried on its own private and secure color of light, or wavelength. A wavelength is usually expressed in nanometers. Using WDM technology, from two to more than 80 separate wavelengths of data can be multiplexed into a light stream transmitted on one optical fiber. However, providing a device that multiplexes the multiple separate wavelengths while achieving a resultant wavelength stability throughout a wide temperature range is difficult because each wavelength of the Coarse Wave Division Multiplexing (CWDM) lasers drifts when an ambient temperature deviates from a prescribed temperature (around 25° C.) and the quality of the signal deteriorates below a required threshold. Thus, the CWDM link does not function properly at outside temperatures far from the prescribed temperatures (below −5° C. or above +55° C.). An overview of CWDM lasers and fiber optic video transmission can be found in (1) *CWDM and OEO Transport Architectures*, Conference Publication "Future Challenges and Opportunities for DWDM and CWDM in the Photonic Networks," IEE Midlands Communications Group, Jun. 11, 2004, and (2) *Fiber Optic Video Transmission: the complete guide*, by D. Goff, Focal Press, 2003. Both of the above noted references are filed together with this application and the entire contents of the references are incorporated herein by reference.

On the receiving side, each channel is then demultiplexed back to the source wavelength. This is the same for all WDM systems, whether they are based on CWDM or Dense Wavelength Division Multiplexing (DWDM) technology.

The differences between CWDM and DWDM systems can be explained by outlining the major components of all WDM systems. These are:

An optical laser (transmitter).
An optical detector (receiver).
Optical filters for multiplexing (add) and demultiplexing (drop).
Optical amplifiers for distance extension.

Typically, the optical laser is used for transmitting a signal and the corresponding detector is used to receive the signal on the same wavelength that was transmitted by the optical laser. In this situation, the wavelength of the laser matches the accepted wavelength range of the receiving system, which consists of optical bandpass filters and broadband detectors. The actual amount of information that is transmitted on a single wavelength is determined by the bit rate of the laser, or the bandwidth of an analog transmission.

The CWDM laser has a specified working ambient temperature (usually 25° C.) for which the laser produces the wavelength (1550 nm for example) with a certain tolerance (3 nm for example), as shown in FIG. 1(*a*). However, as the temperature of the ambient in which the laser operates varies from low temperatures to high temperatures (for example in the range of −30° C. to +85° C.), the CWDM laser wavelength changes (to a range of 1540.4 nm to 1560.2 nm for the above noted temperatures and a laser centered on 1550.0 nm) as shown in FIG. 1(*b*).

As shown in FIG. 1(*f*), an exemplary CWDM Optical Passive component can extract a signal that corresponds to a wavelength of 1551.0 nm if the wavelength is maintained in the range of 1544.5 nm to 1557.5 nm. That is, the CWDM component has a tolerance of +/−6.5 nm with 1 nm offset passband. Thus, if the signal produced by the CWDM laser has a wavelength that is outside the above noted range because of the change in the ambient temperature, the CWDM optical component would not be able to extract the signal, and the use of the CWDM component is drastically limited. The DWDM components tend to behave similar to the CWDM components, but require much tighter temperature control due to more closely spaced wavelengths.

DWDM transceivers also tend to increase the associated operational expenses by consuming more power and dissipating more heat than the CWDM transceivers. This increased heat dissipation causes significant operational problems for optical networks, as discussed above. In essence, a conventional CATV system that uses CWDM components would not be able to transmit the signal to the receiver, which is usually at the headend, when the ambient temperature is outside a given range, typically −5° C. to 55° C. As is known, various parts of U.S. experience temperatures outside that range. Thus, a need exists to provide CATV signal in those areas affected by extreme temperatures.

Passive optical components of a CATV system are optical couplers, optical multiplexers/demultiplexers and Optical Add Drop Multiplexers (OADM). These devices are used to manipulate wavelengths. To transmit data, optical passives take in various optical input source wavelengths and select specific wavelengths that are added to the WDM network. Optical passives are responsible for manipulating wavelengths in a fiber optic system. These functions are not limited to adding, dropping and combining signals.

The cost of a DWDM optical passive is approximately two to three times the cost of a wider-band CWDM optical passive because a DWDM environment has a significantly smaller space between wavelengths (100-GHz typical spacing) than that used in CWDM systems (approximately 2,500 GHz). This demands tight component temperature control, resulting in added cost.

On CWDM-based systems, the wavelength separation between each color of light on the fiber is significantly farther apart, or wider (by a factor of 20) than on DWDM systems. DWDM systems multiplex a large number of individual wavelengths into one fiber by using less space between each wavelength. Metropolitan DWDM systems readily support 32 and 64 wavelengths on a single fiber, and long-haul DWDM systems are typically higher densities. The standard frequency grid for DWDM and wavelength grid for CWDM systems are defined by the International Telecommunications Union standards G.694.1 and G.694.2, respectively.

CWDM is well-suited for applications that have lower data-capacity requirements and for fiber spans that are 50 km or less. This is the typical requirement for metropolitan-to-enterprise-edge applications, where the fiber distances tend to be shorter (less than 50 km). As a result, lower-cost CWDM systems provide more economic benefits while providing the same security, reliability and quality as a DWDM system.

However, conventional CWDMs are subject to intrinsic wavelength drift when operated in temperature ranges lower than −5° C. and higher than +55° C. as discussed above. More specifically, conventional CWDMs exhibit a wide wavelength tolerance as shown in FIG. 1(b) for a typical operating temperature range of the lasers, and the wide wavelength tolerance exceeds the wavelength tolerance required by the CWDM components shown in FIG. 1(f) for example for properly functioning. Therefore, applications that use CWDMs and are exposed to harsh ambient temperatures tend to malfunction, i.e., lack quality or completely cease to function because the mismatch between the wavelength tolerance of the laser and of the passive components.

SUMMARY OF THE INVENTION

To maintain wavelength stability throughout a wide predetermined temperature range, the laser of the present invention is controlled so that its inherent drift does not cause operational problems when the laser is placed into a network employing optically passive devices. Thus, a matching of the wavelength of the laser and the wavelength required by other components is ensured.

According to one aspect of the present invention, an apparatus is provided that includes (1) a laser configured to generate a predetermined wavelength when the laser operates at room temperature, the predetermined wavelength being offset from a specific wavelength, the laser has a controlled wavelength range, the wavelength range having a first wavelength as the upper boundary and a second wavelength as the lower boundary, the first wavelength is generated when the laser operates at a first temperature of an ambient and the second wavelength is generated when the laser operates at a predetermined temperature higher than a second temperature of the ambient, the first temperature is higher than the second temperature, and the first wavelength is shorter than a long wavelength that is generated by a laser centered on the specific wavelength that operates at the first temperature; (2) a heater configured to heat the laser such that a wavelength in the controlled wavelength range that is generated by the laser when heated by the heater from the second temperature is longer than a short wavelength that is generated by the laser centered on the specific wavelength that operates at the second temperature; and (3) a control circuit configured to turn on the heater.

According to another aspect of the present invention, a method for stabilizing a wavelength of the laser includes: providing a laser that generates a predetermined wavelength when the laser operates at room temperature, the predetermined wavelength being offset from a specific wavelength, the laser has a controlled wavelength range, the wavelength range having a first wavelength as the upper boundary and a second wavelength as the lower boundary, the first wavelength is generated when the laser operates at a first temperature of an ambient and the second wavelength is generated when the laser operates at a predetermined temperature higher than a second temperature of the ambient, the first temperature is higher than the second temperature, and the first wavelength is shorter than a long wavelength that is generated by a laser centered on the specific wavelength that operates at the first temperature; measuring a temperature of the ambient of the laser; comparing the measured temperature to a first preset temperature; turning on a heater provided in a vicinity of the laser when the measured temperature is lower than the first preset temperature, the heater heating the laser such that a wavelength in the controlled wavelength range that is generated by the laser when heated by the heater from the second temperature is longer than a short wavelength that is generated by the laser centered on the specific wavelength that operates at the second temperature; measuring the temperature of the ambient with the heater on; and turning off the heater when the measured temperature with the heater on is higher than a second preset temperature.

According to still another aspect of the present invention, a computer program product for stabilizing a wavelength of the laser includes: instructions for generating a predetermined wavelength when a laser operates at room temperature, the predetermined wavelength being offset from a specific wavelength, the laser has a controlled wavelength range, the wavelength range having a first wavelength as the upper boundary and a second wavelength as the lower boundary, the first wavelength is generated when the laser operates at a first temperature of an ambient and the second wavelength is generated when the laser operates at a predetermined temperature higher than a second temperature of the ambient, the first temperature is higher than the second temperature, and the first wavelength is shorter than a long wavelength that is generated by a laser centered on the specific wavelength that operates at the first temperature; instructions for measuring a temperature of the ambient of the laser; instructions for comparing the measured temperature to a first preset temperature; instructions for turning on a heater provided in a vicinity of the laser when the measured temperature is lower than the first preset temperature, the heater heating the laser such that a wavelength in the controlled wavelength range that is generated by the laser when heated by the heater from the second temperature is longer than a short wavelength that is generated by the laser centered on the specific wavelength that operates at the second temperature; instructions for measuring the temperature of the ambient with the heater on; and instructions for turning off the heater when the measured temperature with the heater on is higher than a second preset temperature.

DESCRIPTION OF THE FIGURES

The features and advantages of the present invention will become more apparent from the detailed description set forth below when taken in conjunction with the drawings in which like reference numbers indicate identical or functionally similar elements.

FIGS. 4(a)-(g) are renderings of the physical layout and packaging of an optical component according to one embodiment of the present invention;

FIGS. 7(a) and 7(b) are photographs of optical nodes according to various embodiments of the present invention;

DETAILED DESCRIPTION OF INVENTION

Figure 9:
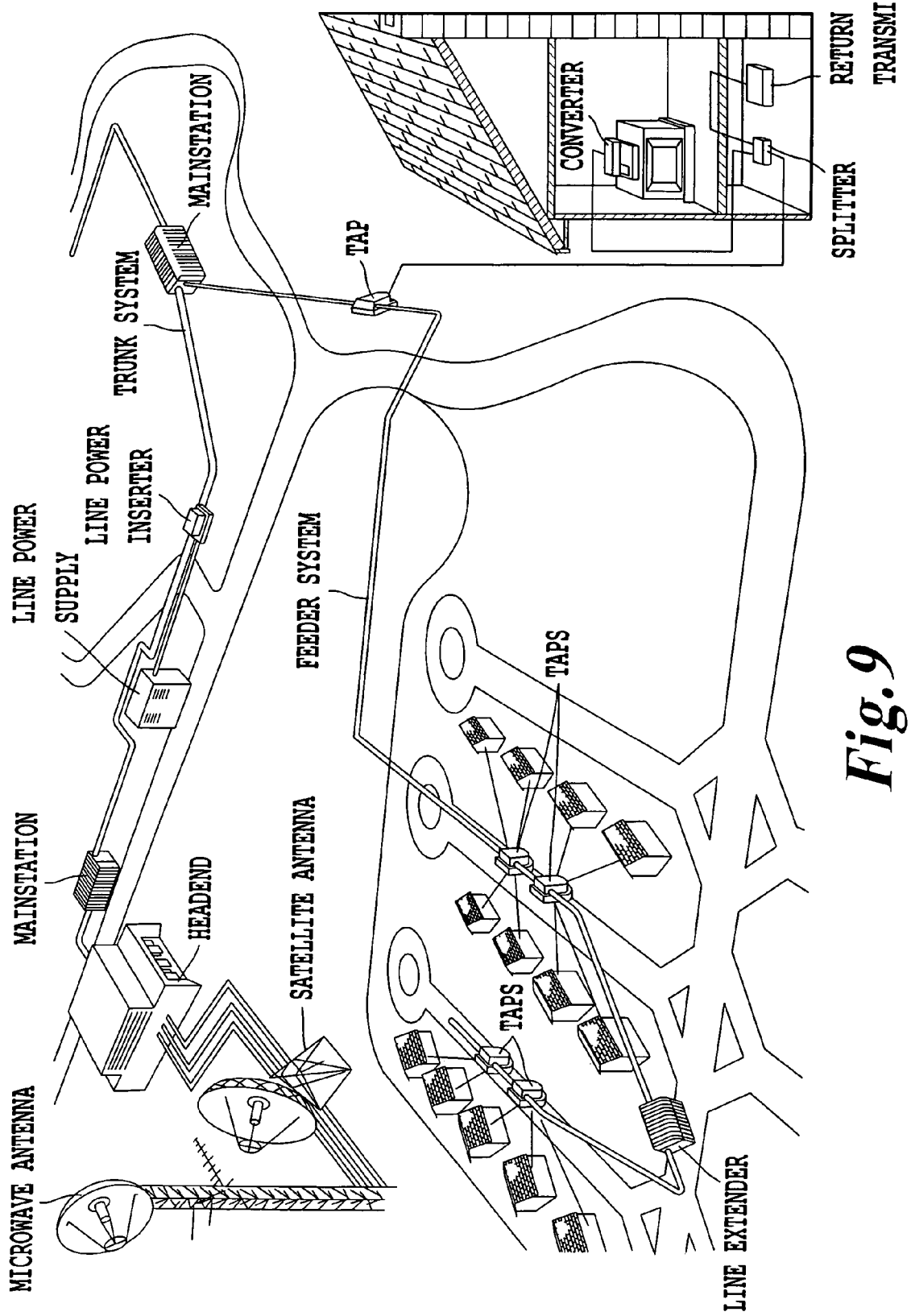
FIG. 9 shows a schematic diagram of a CATV system.

FIG. 9 shows a schematic diagram of a CATV system. The CATV system includes various types of antennas (Microwave, VHF, Satellite, etc.), a main station that collects the signals from the antennas, a line power inserter that provides electric power from a line power supply to the system, a trunk system that connects the main station to various elements of the system, at least a tap that connects the subscriber to the trunk system and line extenders that further extend the trunk system. Some of the above noted components of the CATV system use amplifiers- and optical passives, such as optical add/drop multiplexers, muxes, demuxes, etc.

Some components of the CATV system require lasers for generating optical carriers.

Figure 1:
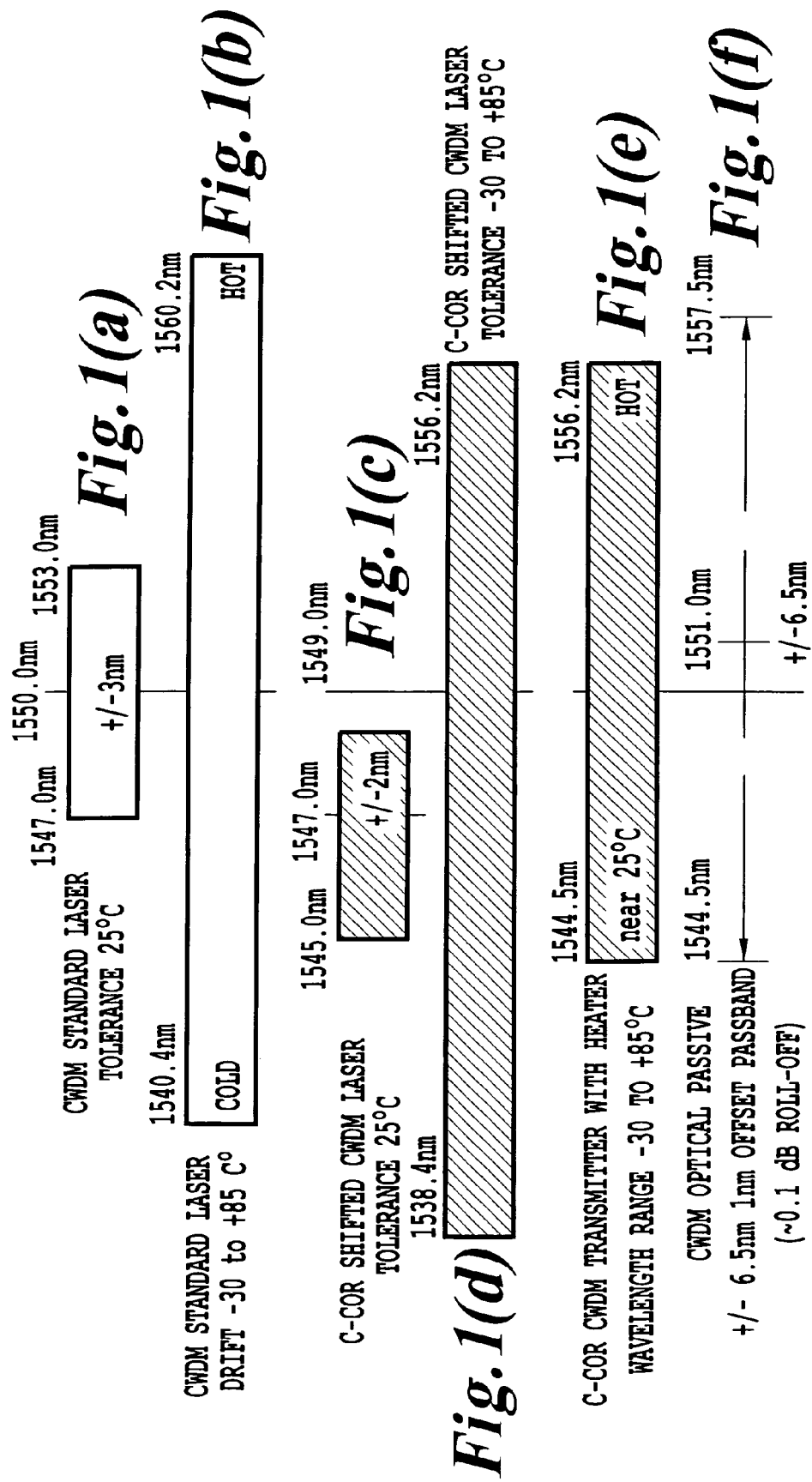
FIGS. 1(a) to 1(f) illustrate various wavelength, temperature, and optical passive bandwidth characteristics of various lasers according to one embodiment of the present invention.

FIG. 1(a) illustrates a wavelength tolerance and temperature characteristics of the 1550.0 nm laser. FIG. 1(b) shows the wavelength tolerance of the same laser when the laser ambient temperature changes in a range from −30° C. to +85° C. The laser, which is one of the components of CWDMs, because of its physical structure, has an inherent drift of the wavelength with the temperature, i.e., the wavelength depends on the laser ambient temperature, being proportional with the temperature. The maximum drift over a given temperature range can be calculated using a laser manufacturer specification sheet. Typically this drift error is maximum 0.12 nm/C. FIG. 1(b) illustrates the inherent drift of the 1550.0 nm laser with the temperature.

However, the laser must not have a wavelength range due to the drift larger than that shown in FIG. 1(f) to generate a usable signal for the CATV system because the wavelengths of the passive components have negligible drift and conventionally the passband of the passive components is limited to that shown in FIG. 1(f).

To employ the 1550.0 nm laser in a harsh environment such as the CATV systems, the wavelength drift of the laser is important and must be taken into consideration to ensure proper performance throughout a changing environment. A typical application for a CWDM laser in the CATV system is in a reverse transmitter of an optical node.

Figure 2:
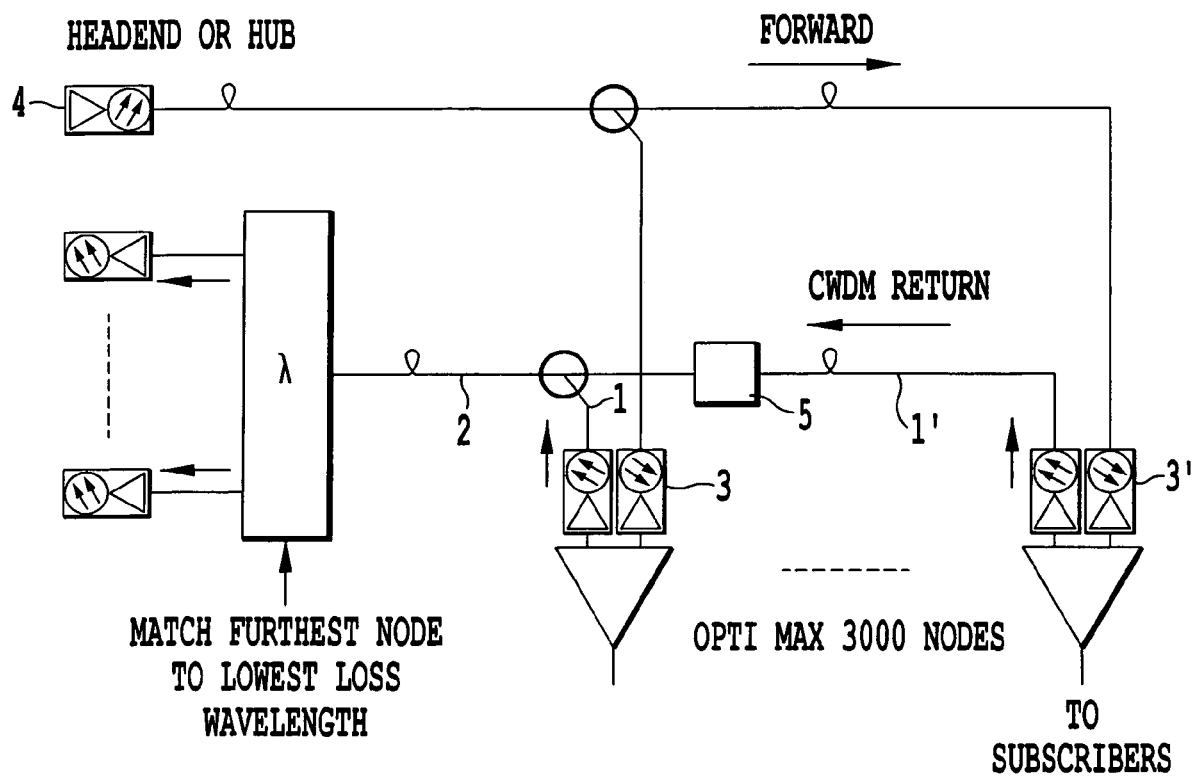
FIG. 2 is a circuit schematic according to one embodiment of the present invention.

FIG. 2 shows an exemplary architecture for combining multiple return paths 1 and 1' onto a single fiber 2 from optical nodes 3 and 3' to a headend or hub 4. Not shown in FIG. 2 are the subscribers that are connected to the optical nodes 3 and 3'. Up to four transmitters may be employed in an optical node 3, each dedicated to a prescribed amount of subscribers and each transmitter being a specific wavelength or color. Thus, up to four lasers having different wavelengths are provided in the optical node 3. One function of the reverse transmitter is to provide upstream data transfer from the subscriber.

Optical passive filters are also employed in the CATV system. The filters can either be internal or external to the optical node. FIG. 2 shows an external optical filter 5. Optical filters provide isolation between the specific wavelengths as well as allowing multiple wavelengths or colors to be multiplexed onto a single mode fiber. The wavelength can also be added or dropped at optical node locations with optical add/drop modules. These optical devices are manufactured with a specific pass band such as a center wavelength 1551.0 nm + or −6.5 nm on either side of a center wavelength as shown in FIG. 1(f). The passive filters also have an associated wavelength drift with temperature but are typically much less per degree C. then the lasers used in the CATV system. A typical drift for the passive filters and the other passive components is in the order of 0.003 nm/C. Thus, the passive filters are less affected by a change in the ambient temperature than the lasers. However, the wavelength of the laser must match the wavelength range of the passive components across a wide temperature range.

The CATV system has the majority of its components located in protective enclosures that are exposed to extreme cold as well as extreme heat changes throughout the year. The protective enclosures protect the components from water infiltration but do not actively control the temperature of the components located in the enclosures. Indirectly, the enclosures "influence" the temperature of the internal modules by heat transfer from the internal modules through the enclosures to the enclosure ambient air. Thus, the enclosure ambient temperature (temperature outside the enclosure) influences the temperature inside the enclosures (outside plants). An operating specification for the outside plant devices is 40° C. to +60° C. external ambient to the enclosure. This operating specification helps ensure uninterrupted service to the customer when large variations of temperature in the range of −40° C. to +60° C. occur in the ambient to the enclosure.

The temperature of the laser case (the case that directly holds the laser) should also be factored in due to the power dissipated in the form of heat by the active components, for example the laser. At 60° C. ambient to the enclosure, the laser case temperature can approach or exceed 85° C. because of the heat dissipated by the laser and other elements inside the transmitter enclosure. As discussed above, a conventional laser at +85° C. is unable to generate a reliable wavelength that is within the passband of the optical passive component.

At a maximum wavelength drift of 0.12 nm/C, the laser could be outside the pass band of the optical filter or greatly attenuated, making data recovery difficult or impossible. Thus, without laser compensation, the CATV system is limited to fair weather regions or be non operable during extreme temperature conditions.

To overcome the limitations imposed on the CWDMs by the laser ambient temperature, the present inventors have offset the specific wavelengths of the lasers that are typically used in the CATV system to a predetermined corresponding wavelength. For example, by offsetting the specific 1550.0 nm wavelength of the laser by 3 nm as shown in FIG. 1(c), a 1547.0 nm laser would have a positive tolerance that is not beyond the range required by the passband of the passive components when the ambient temperature increases to +85° C., as shown in FIG. 1(d). In other words, the offsetting of the wavelength of the laser increases the temperature working range of the laser from +80° C. to +85° C., ambient to the laser. FIG. 1(b) shows that the conventional laser produces a wavelength outside the required wavelength range of the optical passive (see FIG. 1(f)) for a temperature of +85° C.

However, the wavelength tolerance of the laser when operating at low laser ambient temperatures exceeds the working range of the passive components, making the laser unusable for the 1551.0 nm centered passband for the optical passive components (see FIGS. 1(d) and 1(f)).

The present inventors have overcome this problem by using the offset laser with a heater to increase the ambient temperature of the laser such that a wavelength of the laser for a node ambient temperature of −40° C. is still within the passband of the optical passive components (see FIGS. 1(e) and 1(f)). A node includes both the laser and the enclosure.

In other words, using a numeric example for illustration only, FIG. 1(c) shows that a 1547.0 nm laser is offset by 3 nm from a conventional 1550.0 nm laser such that a wavelength range of the offset laser is between 1545.0 nm and 1549.0 nm for an ambient temperature of the laser equal to the room temperature. For this application purposes, it is defined that room temperature is in a range of +/−5° C. of +25° C.

If the internal ambient temperature at the laser reaches +85° C., the wavelength of the laser drifts to a maximum of 1556.2 nm as shown in FIG. 1(d), which is still in the range required by the passive components having the passband shown in FIG. 1(f). Thus, at laser internal ambient temperatures between +25° C. and +85° C., the offset laser according to the present embodiment maintains the drifting wavelength in the range of the passive components. If the laser internal ambient temperature reaches the other extreme value, −30° C. for example, the heater starts heating the laser to maintain the laser around a temperature of about +25° C., and thus providing a shortest wavelength value around 1544.5 nm, which is still in the passband required by the passive components (see FIGS. 1(e) and 1(f)). Thus, the shortest drifting wavelength of the offset laser when the heater is not provided is corrected by the heater to 1544.5 nm from 1538.4 nm, in this particular example. However, for other lasers other numerical values would apply. The device of the present embodiment is not limited to the numerical values discussed above.

Thus, the offset laser according to the present embodiment (having an offset wavelength) achieves a first wavelength for a high internal transmitter enclosure temperature and a second wavelength for a low internal transmitter enclosure temperature and both the first and second wavelengths are inside a wavelength range required by the passive components for any temperature between the first and second temperatures.

It is noted that the internal transmitter enclosure temperature is different from the temperature of the laser case. Further, the first wavelength is influenced by the offset wavelength and the second wavelength is influenced by the temperature change produced by the heater.

In other words, the wavelength of the laser is offset by a value calculated such that the first wavelength is appropriate for the passive optical component even when the internal transmitter enclosure temperature is high (around +85° C.). Further, the heater heats the laser when the internal transmitter enclosure temperature is low (below a preset temperature) and thus, the laser generates the second wavelength such that the second wavelength is within the passband of the optical passive components.

The laser of the present embodiment, when compared to a conventional laser centered on a specific wavelength, is configured to emit a predetermined wavelength that is offset from the specific wavelength. The laser has a controlled wavelength range having a first wavelength (1556.2 nm for example) as the upper boundary and a second wavelength (1544.5 nm for example) as the lower boundary. The first wavelength is generated when the laser operates at a first temperature (+85° C. for example) of the internal transmitter enclosure and the second wavelength is generated when the laser operates at a predetermined internal transmitter enclosure temperature (+25° C. for example), higher than a second temperature (−30° C. for example) of the node in which the laser and the enclosure are placed. The first wavelength is lower than a long wavelength (1560.2 nm for example) that is generated by the laser centered on the specific wavelength (1550.0 nm for example). The heater heats the laser such that a wavelength in the controlled wavelength range that is generated by the laser when heated by the heater from the second temperature is longer than a short wavelength (1538.4 nm for example) that is generated by the laser centered on the specific wavelength for the second temperature of the ambient (see FIGS. 1(b) and 1(e)). The heater is provided with a control circuit configured to turn on the heater.

Figure 3:
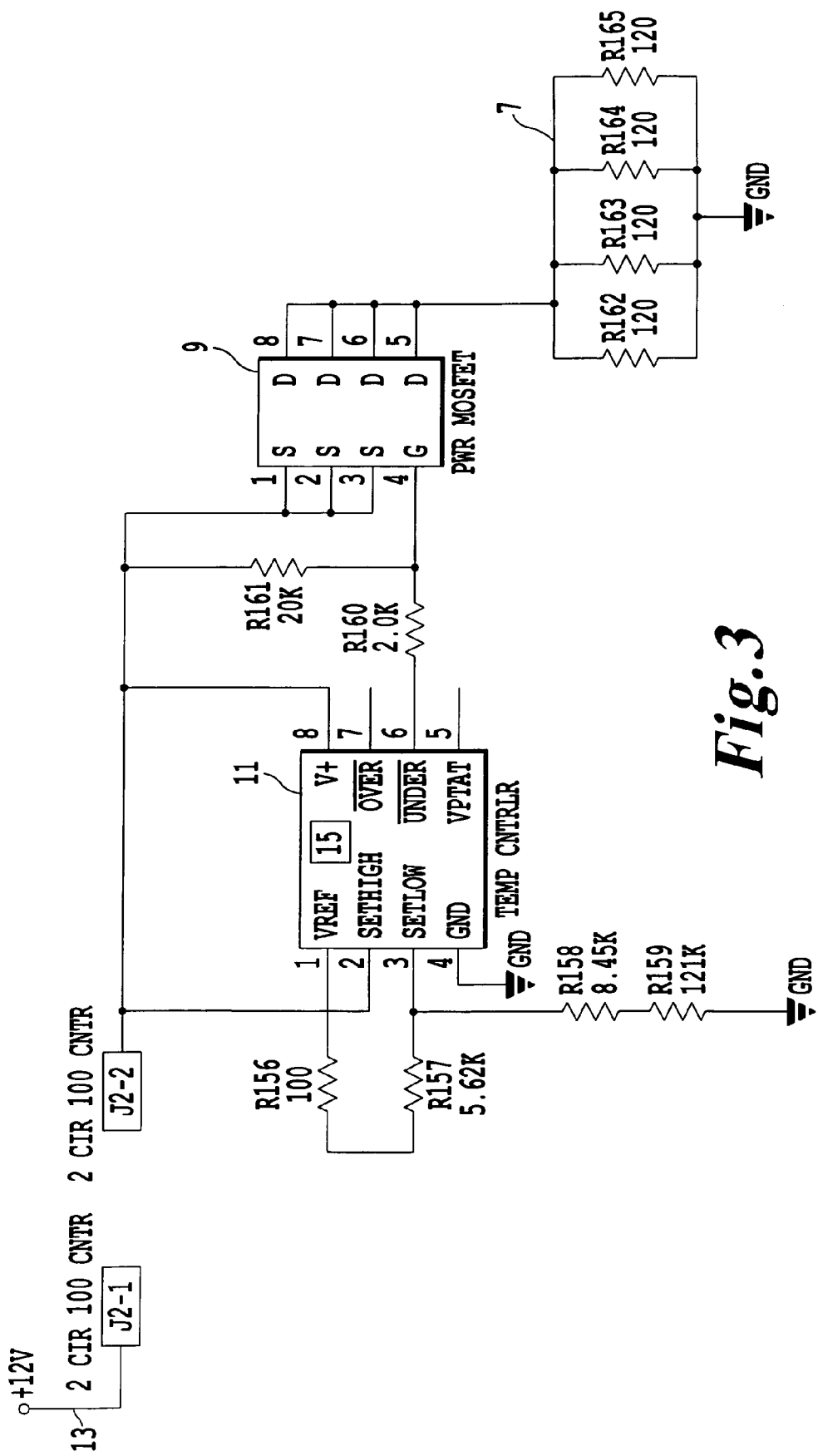
FIG. 3 is circuit schematic of a heater control circuit according to one embodiment of the present invention.

FIG. 3 shows in more detail an electrical configuration of the control circuit 11 and the heater 7. The heater 7 includes in this embodiment four resistors R162 to R165 connected in parallel, each having a resistance of 120Ω. However, it is possible to have any number of resistors connected either in series or in parallel that would provide heat as can be appreciated by one of ordinary skill in electronics.

The heater 7 is connected to a power MOSFET 9 that acts as a switch to switch on and off the heater 7 as required. The switch 9 is controlled by a temperature control unit 11 that senses the ambient temperature. The switch 9 can be a power MOSFET, and the temperature control unit 11 is a programmable temperature controller that detects a temperature based on a comparison of a measured voltage and a reference voltage. Alternatively, a temperature sensor 15 could be provided for measuring the temperature. The temperature control unit 11 compares the sensed temperature with a reference temperature and switches on the switch 9 if the sensed temperature is below the reference temperature.

As the heater 7 is turned on, the wavelength of the laser would drift upward at its prescribed rate per degree C., i.e., becomes a longer wavelength. The temperature control unit 11 also employs an upper set point using a hysteresis, which shuts the heater off, and the laser drifts back until the cycle starts again.

For example, the control unit is set point and hysteresis dependant. The set point of the control circuit is chosen to match a start up wavelength of the laser. For example, 25° C. can be chosen as the low set point of the control unit. As the internal transmitter enclosure temperature decreases, the control circuit compares (i) a DC voltage dependent on that temperature to (ii) a fixed reference set up by a resistive network that matches the low trigger set point (25° C.). As the internal transmitter temperature falls below the set point the control unit outputs a signal that turns on the heater element.

The hysteresis of the circuit is the difference between the set point temperature and the temperature at which the control circuit turns off the heater. In one exemplary embodiment, the temperature at which the heater was turned off was set 30° C. over the low set point (25° C.). In this exemplary embodiment, the value of 30° C. has been used to be optimal for the low node ambient temperature (−40° C.). This 30° C. hysteresis ensures that the heater will stay on at the low temperature extremes due to the fact that the control unit does not receive a signal that the internal transmitter enclosure temperature has risen above the hysteresis set point. The amount of hysteresis is determined by selecting a load resistance.

Thus, as the node ambient temperature falls to the extreme of −40° C., depending on the power of the heater, the upper set point can no longer be reached and the heater stays on continuously, supplying constant heat to the laser and ensuring reliable service to the customer.

The temperature control unit and the heater are connected to a power supply 13, which can be a 12 V source as shown in FIG. 3. However, any power supply line available in the node enclosure in which the laser is housed can be used to supply the heater.

In the present embodiment, the approach described above was used for CWDM lasers with a wavelength offset from the 1550.0 nm. However, in other embodiments, the laser could be offset from a main wavelength in the range from 1270.0 to 1610.0 nm.

FIGS. 4(a) to 4(d) show isometric views of the transmitter enclosure 17 in which the laser is provided. More specifically, FIGS. 4(c) and (d) show front and rear views of the transmitter enclosure. The transmitter enclosure is installed in the Multi-Functional Node, which is deployed in a cable television/radio distribution network that includes a head end multiplexer, line equalizers, line extenders, amplifiers, converters, and back end demultiplexers. The transmitter enclosure 17 has various data terminals (electric and optical cables) that connect the transmitter enclosure to the optical fiber and feed the electrical signals or electrical power to and from the transmitter enclosure. According to one embodiment of the present invention, the transmitter enclosure is part of the Opti Max3000 Multi-Functional Node (not shown) (manufactured by C-COR, Inc, 60 Decibel Road, State College, Pa., 16801) and has different variants, a few of which are characterized as shown in Table 1. Other variants of C-COR's node family are possible and the table below shows exemplary models of the Opti Max3000 Node.

TABLE 1

General Node Specifications

|  | Receiver Only | RF Amp Only | Combined |
|---|---|---|---|
| RF Output Level, min. at Pin = −2 dBm, dBmV | 21 | — | — |
| Amplifier Module Gain, at 862 MHz, dB | — | 28 | — |
| Response Flatness, forward and return, peak-to-peak, typ., dB | — | 1.0 | 1.0 |
| Referenced Output Level, 54/550/862 MHz, dBmV (Note 1) | — | 35.5/43/48 | 35.5/43/48 |
| Number of Analog Channels Performance | — | 77 | 77 |
| Carrier-to-Noise, min. dB | 51.3 | — | 51.3 |
| Composite Triple Beat, typ., −dBc | 68 | 74 | 64.5 |
| Composite Second Order, typ., −dBc | 63 | 74 | 62 |
| Cross Modulation, −dBc | — | 72 | 61 |
| Noise Figure, dB | — | 8 | — |

1. All calculations based on 77 analog channels for 50 to 550 MHz and digital loading 550 to 862 MHz.

| 1310 nm and 1550 nm DFB Return Transmitter Specifications | |
|---|---|
| Optical Specifications | |
| Laser Type | Isolated Uncooled DFB |
| Transmission Wavelength, nm | NRT-1310DFB: 1310 ± 20 |
| | NRT-1550DFB: 1550 ± 20 |
| Output Power, dBm | 3 ± 1.0 |
| Connector Types | SC/APC, FC/APC |
| RF Specifications | |
| Bandwidth, MHz | 5 to 200 |
| Impedance, Ohm | 75 |
| Return Loss, from max. gain to 8 dB of attenuation, dB | 17 |
| Flatness, with respect to gain slope, max., dB | ±0.75 |
| Gain Slope, max., dB (Note 1) | ±0.5 |
| Level Stability, over temp., dB | ±3.0 |
| Manual Gain Control Range | >8 dB |
| Reverse Spurious, −dBc | <50 |
| RF Testpoint Insertion Loss, dB (Note 2) | −9 ± 0.5 |
| Performance Specifications (Note 3) | |
| Optimum Transmitter Input, dBmv/6 MHz (dBmV/Hz) | 6 (−62) |
| Optimum Testpoint Level, dBmV/6 MHz (dBmV/Hz) | −3 (−71) |
| NPR/Dynamic Range, dB (Note 4) | 41/12 |
| NPR Peak, dB (Notes 4 and 5) | 48 |
| BER Dynamic Range, QPSK @ $10^{-6}$, dB (Note 4) | 45 |
| Powering Specifications | |
| Input Voltage, $V_{DC}$ | 24 ± 0.5 |
| Current Draw, max., mA | 225 |

| 1310 nm and 1550 nm DFB Return Transmitter Specifications | |
|---|---|
| Environmental Specification | |
| Operating Temperature, within Opti Max 3000 node | −30 to 85° C. |

1. Measured as a straight line from 5 to 200 MHz. At a full range of gain adjust, slope will increase to 1 ± 0.5 dB.
2. RF testpoint is −9 dB referenced to transmitter input with transmitter set to maximum gain (minimum attenuation).
3. Performance specs measured while installed in an Opti Max 3000 node with a receiver causing low degradation to performance (≤0.5 dB).
4. Measured over 6 dB fiber link using 40 MHz NPR loading.
5. Typical NPR performance measurements taken at room temperature.

| CWDM Return Transmitter Specifications | |
|---|---|
| Optical Specifications | |
| Laser Type | Isolated Uncooled DFB |
| Transmission Wavelengths, nm ± 7.5 nm | 1470, 1490, 1510, 1530, 1550, 1570, 1590, 1610 |
| Output Power, dBm | 3 ± 1.0 |
| Connector Types | SC/APC, FC/APC |
| RF Specifications | |
| Bandwidth, MHz | 5 to 200 |
| Impedance, Ohm | 75 |
| Return Loss, from max. gain to 8 dB of attenuation, dB | 17 |
| Flatness, with respect to gain slope, max., dB | ±0.75 |
| Gain Slope, max., dB (Note 1) | ±0.5 |
| Level Stability, over temp., dB | ±3.0 |
| Manual Gain Control Range | >8 dB |
| Reverse Spurious, −dBc | <50 |
| RF Testpoint Insertion Loss, dB (Note 2) | −9 ± 0.5 |
| Performance Specifications (Note 3) | |
| Optimum Transmitter Input, dBmv/6 MHz (dBmV/Hz) | 6 (−62) |
| Optimum Testpoint Level, dBmV/6 MHz (dBmV/Hz) | −3 (−71) |
| NPR/Dynamic Range, dB (Note 4) | 35/15 |
| NPR Peak, dB (Notes 4 and 5) | 45 |
| BER Dynamic Range, QPSK @ $10^{-6}$, dB (Note 4) | 35 |
| Powering Specifications | |
| Input Voltage, $V_{DC}$ | 24 ± 0.5 |
| Current Draw, max., mA | 600 |
| Environmental Specification | |
| Operating Temperature, within Opti Max 3000 node | −30 to 85° C. |

1. Measured as a straight line from 5 to 200 MHz. At a full range of gain adjust, slope will increase to 1 ± 0.5 dB.
2. RF testpoint is −9 dB referenced to transmitter input with transmitter set to maximum gain (minimum attenuation).
3. All performance specifications measured while installed in an Opti Max 3000 node with an optical receiver causing low degradation to performance (≤0.5 dB).
4. Measured over 6 dB fiber link using 40 MHz NPR loading.
5. Typical NPR performance measurements taken at room temperature.

Figure 4A:
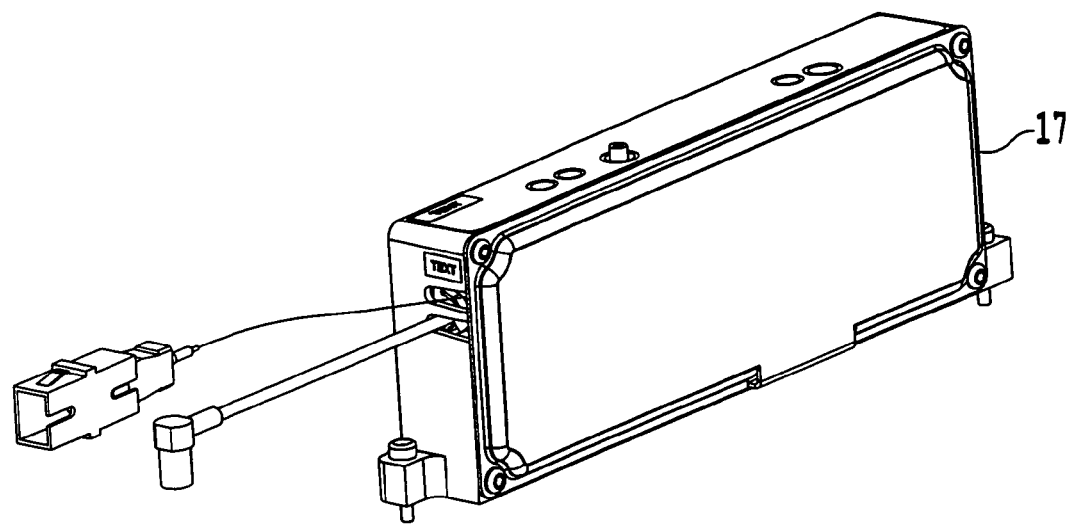
Figure 4B:
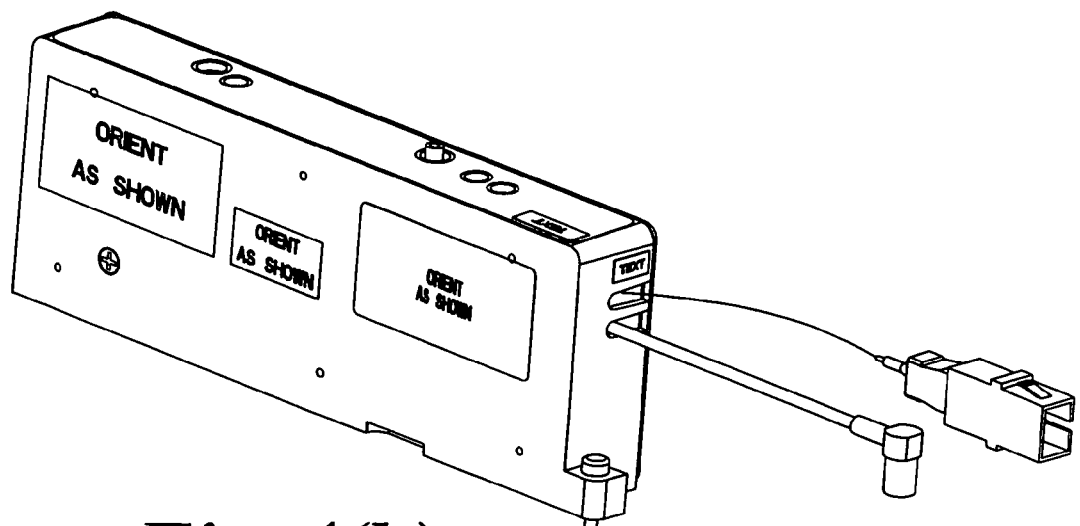
Figure 4E:
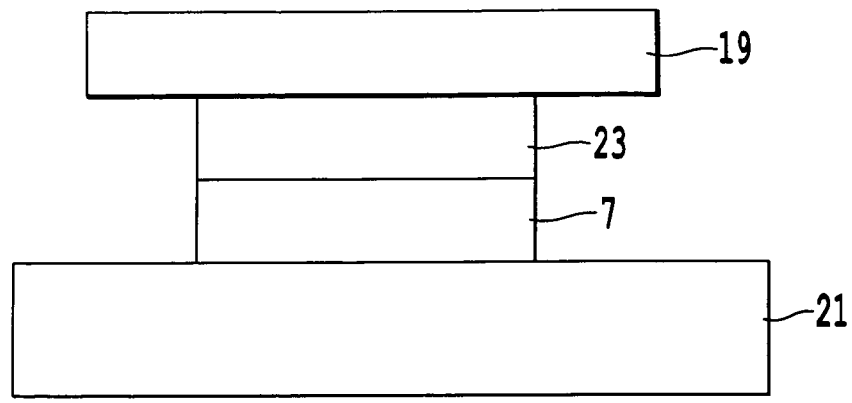

FIG. 4(c) shows the physical transmitter enclosure, depicting the circuit board 21, the laser 19, the heater 7 and the temperature sensor 15. The heater 7 can be formed directly on the circuit board 21, underneath the laser 19, as shown for example in FIG. 7(a). Preferably, a thermally conductive foam is formed on the heater 7 and the laser 19 is formed in direct contact with the foam. FIG. 4(e) shows a cross-sectional view of the circuit board 21, the heater 7, the thermal interface material (foam) 23 and the laser 19. Alternatively, the thermally conductive foam can be replaced with a compressible material that has good heat conductivity such that the material is tightly packed between the heater and the laser. This arrangement also provides supplemental stability to the laser. In this embodiment, the heat radiates from the heater to the laser, providing radiative heating.

Figure 4F:
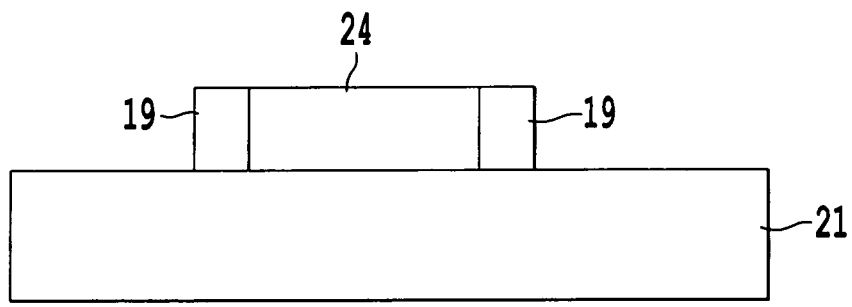

In another embodiment illustrated in FIG. 4(f), the heater is a mylar strip (or a Teflon tape) 24 that is connected to the switch as shown in FIG. 3. The mylar strip 24 contains a heating element (for example a metallic heater coil or wire) and is wrapped around the laser to provide the necessary heat. It is noted that the heater is provided outside the housing of the laser, thus being appropriated for any off the shelf laser. However, if a better heat transfer and heat efficiency is desired, the heater can be provided inside the housing of the laser.

Figure 4G:
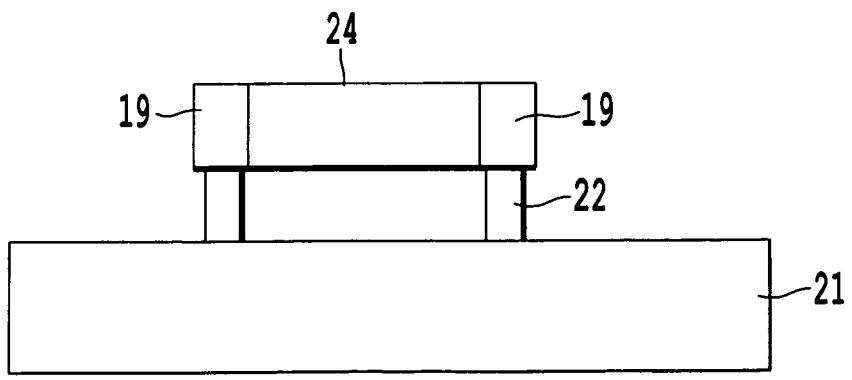

FIG. 4(g) shows that the laser 19 and the strip of mylar 24 including the heating element are not necessarily in contact with the circuit board 21. In this embodiment, supports 22 maintain the laser 19 at a predetermined distance away from the circuit board 21. It is also noted that both FIGS. 4(f) and 4(g) show only one laser 19.

Figure 5:
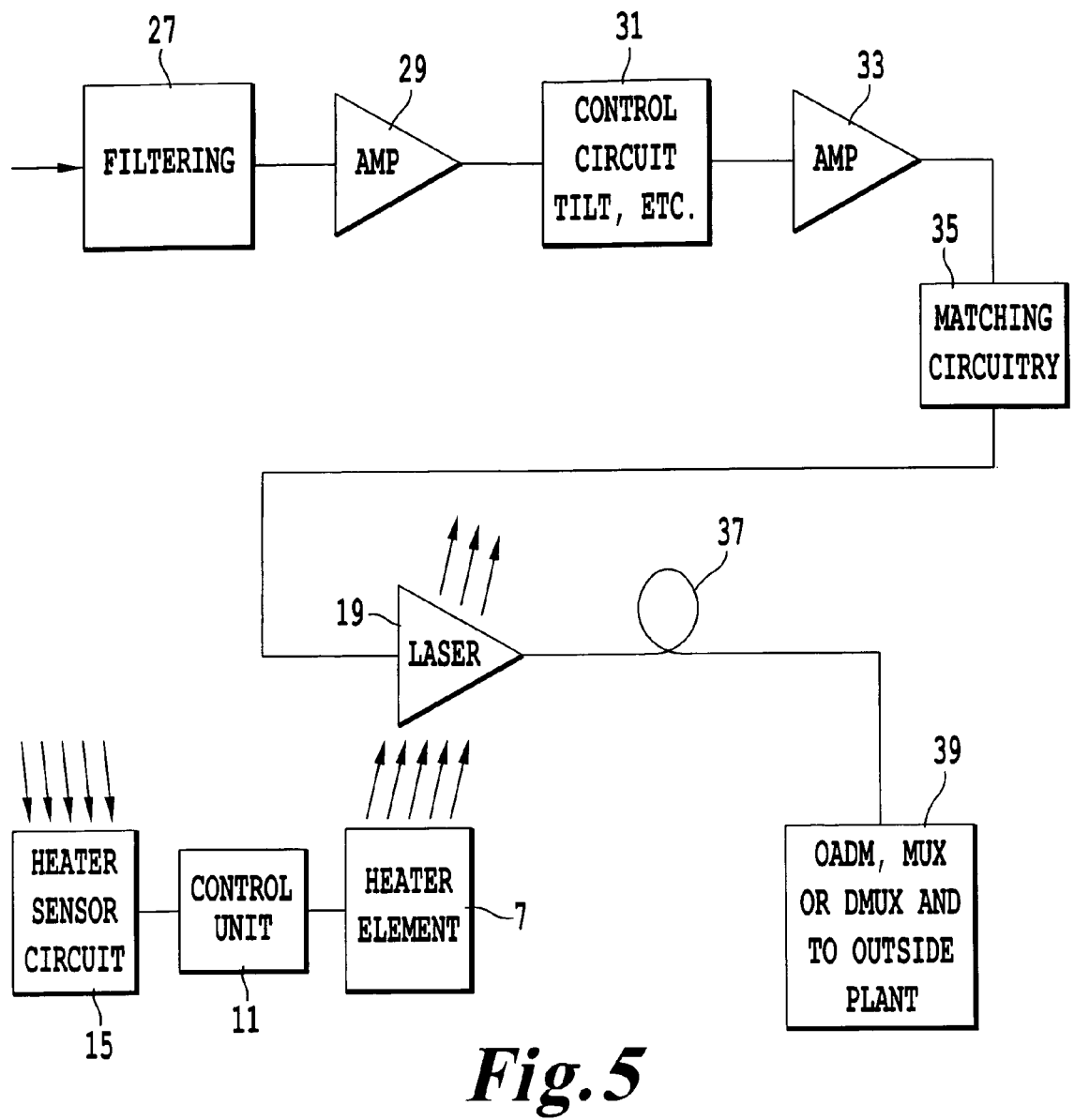
FIG. 5 is a block diagram of an optical component according to one embodiment of the present invention.

A block diagram of the above described laser provided with the heater is shown in FIG. 5. An incoming signal is filtered by a filter 27, amplified by a first amplifier 29, and controlled by a control circuit 31 for tilt and other characteristics. This controlled signal is further amplified by a second amplifier 33, matched with a matching circuit 35 and converted to an optical signal by the laser 19. The optical signal is fed to a fiber optic cable 37 to a multiplexer, demultiplexers, an optical add/drop multiplexer (OADM) or an optical coupler 39. The temperature sensor 15 senses a temperature of the ambient of the laser 19 and sends a signal to the temperature control unit 11. The temperature control unit 11 determines whether the heater 7 should be turned on or off.

Figure 6:
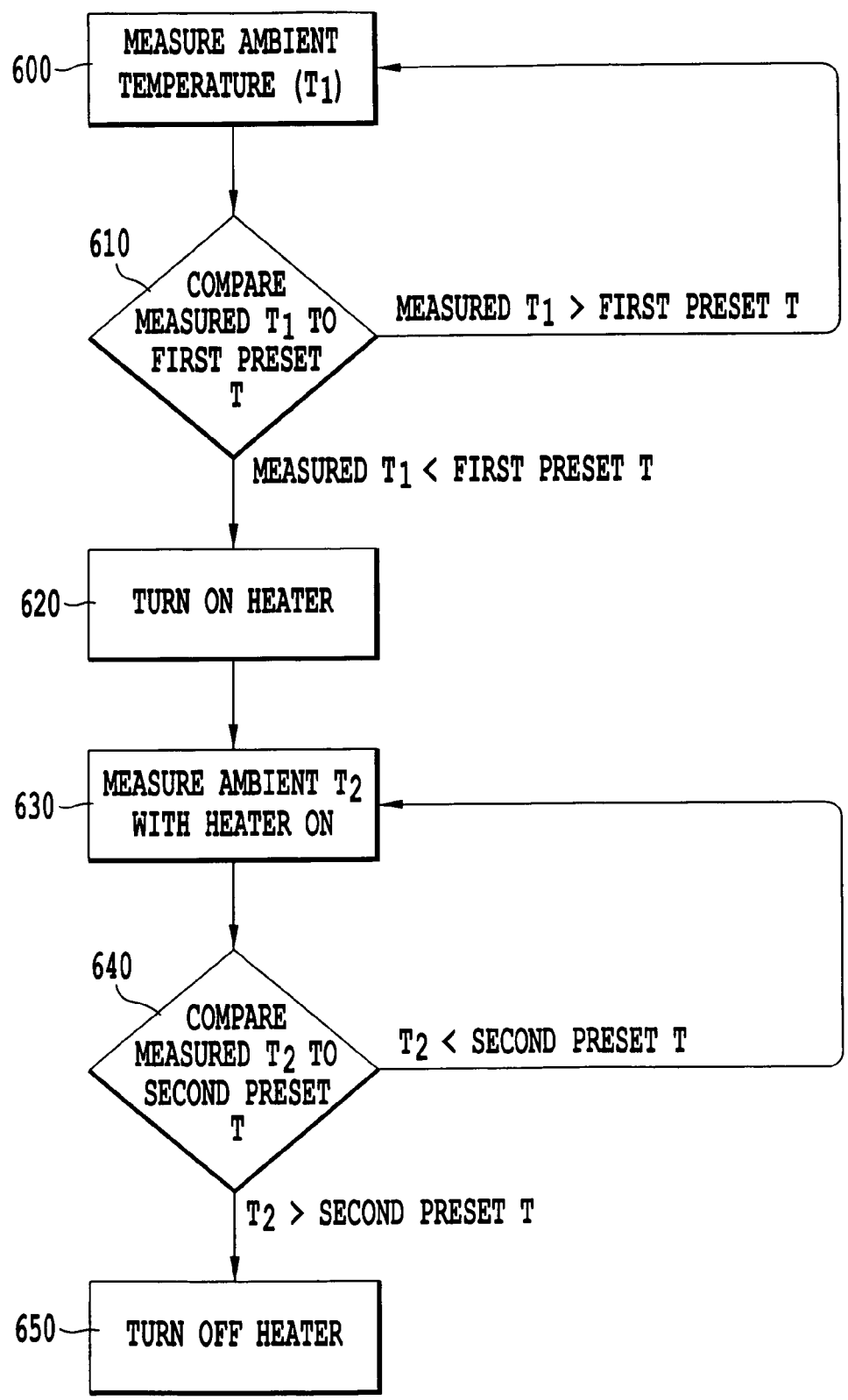
FIG. 6 is a flow chart of the steps for controlling a temperature of the laser according to one embodiment of the present invention.

FIG. 6 is a flow chart showing in more details the controlling steps of the temperature control unit 11 for controlling the temperature of the ambient around the laser 19. According to step 600, the temperature sensor, either continually or at certain time intervals, determines the temperature of the ambient and outputs an electrical signal indicative of that temperature. The temperature control unit 11 compares in step 610 the measured temperature to a first preset temperature. If the measured temperature is above the first preset temperature, the temperature control unit does not output an electrical signal and continues to monitor the ambient temperature. If the measured temperature is below the first preset temperature, then the temperature control unit turns the heater on in step 620.

In step 630, the temperature control unit measures the ambient laser temperature when the heater is on. In step 640, the temperature control unit compares the measured temperature to a second preset temperature, and if the measured temperature is lower than the second preset temperature, then the temperature control unit does not output an electrical signal but continues to compare the newly measured temperature to the second preset temperature.

However, if the measured temperature is higher than the second preset temperature, then the temperature control unit turns off the heater in step 650.

An example of measured ambient node temperatures, transmitter enclosure internal temperatures, laser case temperatures and the associated wavelengths is shown in Table 2.

TABLE 2

| Node ambient temperature (Celsius) | Transmitter enclosure internal temperature (Celsius) | Laser case temperature (Celsius) | Laser wavelength (nm) |
|---|---|---|---|
| −39.8 | −7.6 | 38.7 | 1468.64 |
| −30.3 | 1.8 | 48.5 | 1469.56 |
| −20.2 | 11.8 | 58.6 | 1470.52 |
| −10.8 | 21.8 | 68.2 | 1471.44 |
| −9.6/−9.6 | 22.8/17.4 | 68.6/27.0 | 1471.44/1468.12 |
| −0.2/−0.2 | 27.6/23.0 | 70.8/28.6 | 1471.76/1468.40 |
| +10.0/+10.0 | 34.2/29.2 | 72.4/30.8 | 1472.00/1468.72 |
| +12.2/+12.2 | 35.2/30.0 | 72.8/31.2 | 1472.04/1468.76 |
| +20.2 | 37.4 | 38.6 | 1469.48 |
| +30.2 | 47.4 | 48.6 | 1470.44 |
| +59.5 | 78.2 | 80.1 | 1473.28 |

In Table 2, the first column shows the ambient temperature of the node. This is usually the temperature of the environment in which the node is placed, i.e., the temperature of the ambient air. The laser is installed in a transmitter enclosure, which is subsequently installed in the node. The second column shows the transmitter enclosure internal temperature. The third column shows the laser case temperature. The fourth column shows the wavelengths for the laser as it is operating under the given conditions stated in the previous columns. It is noted that the temperature of the laser case for low transmitter enclosure internal temperatures is determined by the inherent temperature of the laser and the heat provided by the heater.

The heater was on continuously for ambient node temperatures below −9.6 C and was continuously off for ambient node temperatures above 12.2 C. In the ambient node temperature interval of −9.6 C to 12.2 C, the heater had periods of time on and periods of time off. For example, at the lowest ambient node temperature of −9.6 C, where the heater started to cycle on and off, the heater was on for about 9 minutes and then off for about 2 minutes, with this cycle repeating itself as long as the −9.6 C ambient node temperature was maintained. The times on and off for the 12.2 C ambient node temperature, which was the highest ambient node temperature where the heater was cycling on and off, was about 2 and about 10 minutes, respectively.

It is noted that for those node ambient temperatures for which the heater was cycling on and off, the fourth column of Table 2 shows two values for the wavelengths, the first one corresponding to the heater being on and the second corresponding to the heater being off. Comparatively, the second column shows values for the transmitter enclosure internal temperature when the heater is on (first value) and off (second value). Also the third column shows values for the laser case temperature when the heater is on (first value) and off (second value).

During the test of the 1470 nm laser provided with the heater, the stability of the laser wavelength was maintained with a tolerance of +/−3 nm for a broad range of ambient node temperatures, for example from −39.8 C to 59.5 C. However, other experiments have shown that the wavelength remains stable up to +85° C. It is noted that the ambient node temperature (temperature outside the protective node enclosure) is different than the temperature inside the transmitter enclosure.

Figure 7A:
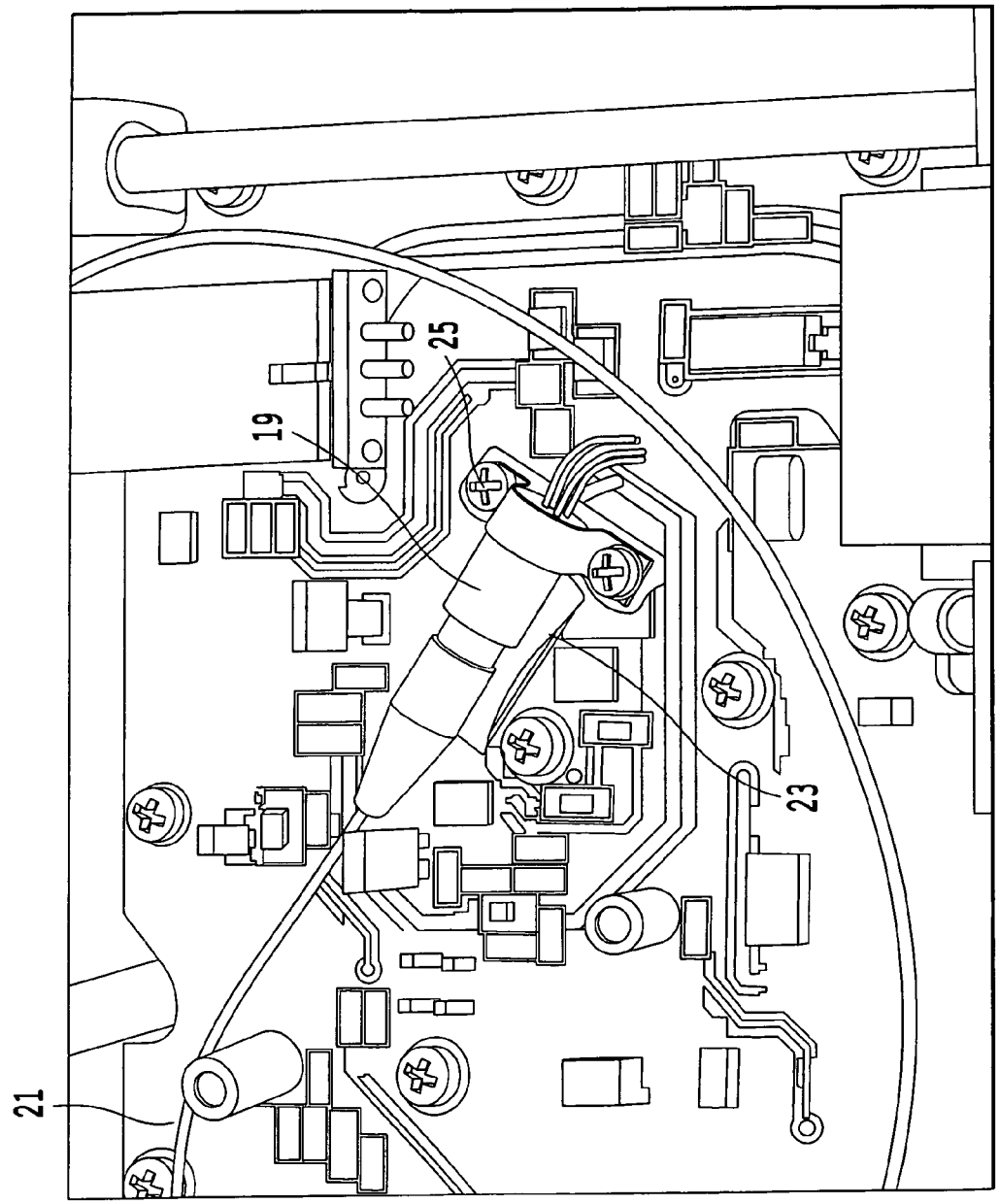

FIGS. 7(a) and (b) show photographs of the optical transmitter including a laser similar to that tested above. More specifically, FIG. 7(a) shows the offset laser 19 provided with the heater 7 (not shown) and the thermal interface material 23 underneath. The laser 19 is fixed with a flange 25 on the circuit board 21. FIG. 7(b) shows the offset laser according to another embodiment of the present invention. In this embodiment, the laser 19 is mounted to a mounting block/heatsink 27, which is attached to the circuit board. The mounting block/heatsink is made of aluminum (Al) or other material having good thermal properties. The heater is a foil heater wrapped around the laser barrel and held in place by the mounting block.

Figure 8:
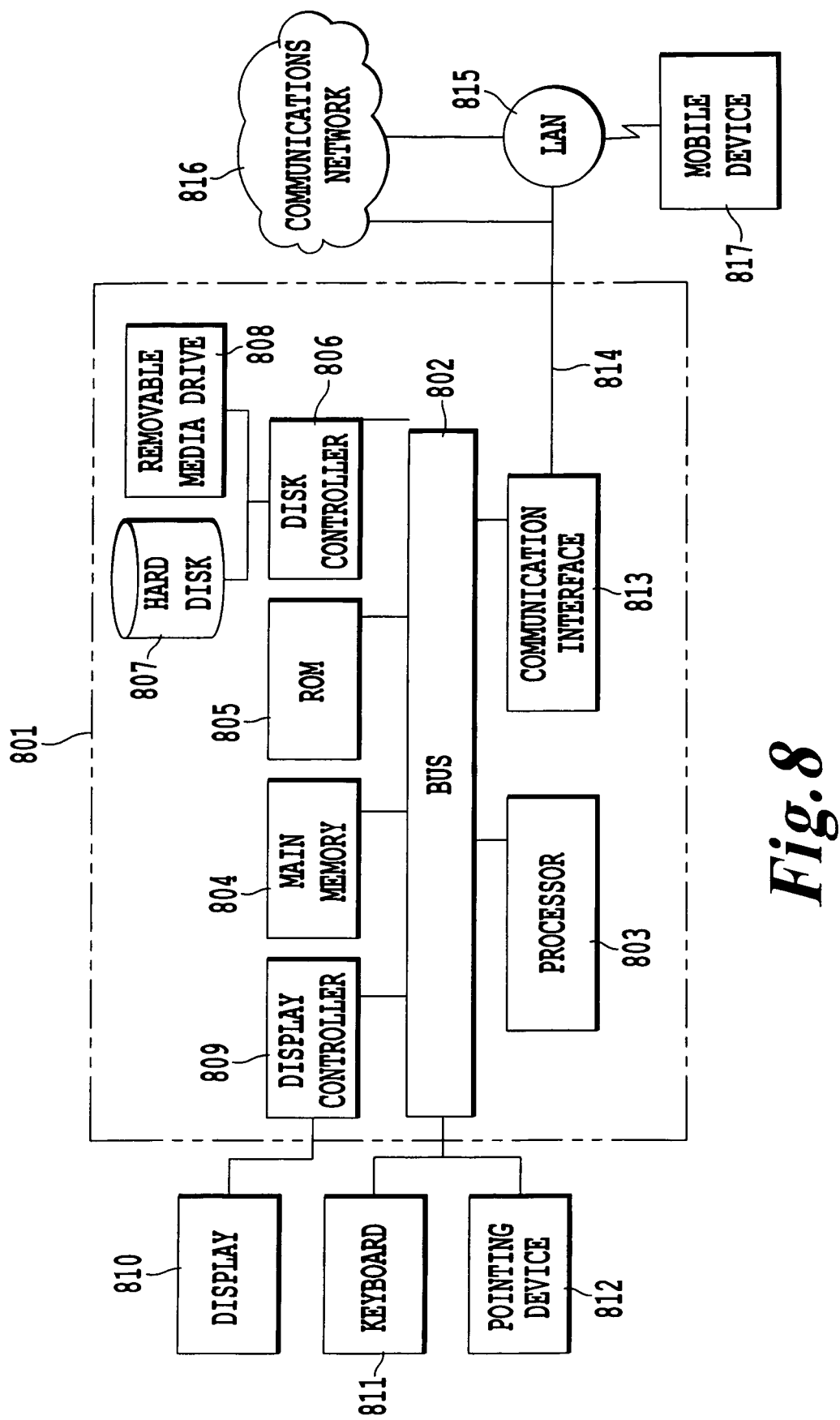
FIG. 8 is a block diagram of a processor associated with an embodiment of the present invention.

FIG. 8 illustrates a control system 801 (for example an integrated circuit (IC), a micro-controller (μC), a programmable system-on-chip (PSoC), etc.) upon which an embodiment of the present invention may be implemented. The control system 801 includes a bus 802 or other communication mechanism for communicating information, and a processor 803 coupled with the bus 802 for processing the information. The control system 801 also includes a main memory 804, such as a random access memory (RAM) or other dynamic storage device (e.g., dynamic RAM (DRAM), static RAM (SRAM), and synchronous DRAM (SDRAM)), coupled to the bus 802 for storing information and instructions to be executed by processor 803. In addition, the main memory 804 may be used for storing temporary variables or other intermediate information during the execution of instructions by the processor 803. The control system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The control system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the control system 801 using an appropriate device interface (e.g., small control system interface (SCSI), integrated device electronics (IDE), enhanced-IDE (E-IDE), direct memory access (DMA), or ultra-DMA).

The control system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The control system 801 may also include a display controller 809 coupled to the bus 802 to control a display 810, such as a cathode ray tube (CRT), for displaying information to a computer user. The control system includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the control system 801.

The control system 801 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the control system 801 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the control system 801, for driving a device or devices for implementing the invention, and for enabling the control system 801 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 803 for execution. A computer readable medium may take many forms, including but not limited to, non-volatile media, volatile media, and transmission media. Non-volatile media includes, for example, optical, magnetic disks, and magneto-optical disks, such as the hard disk 807 or the removable media drive 808. Volatile media includes dynamic memory, such as the main memory 804. Transmission media includes coaxial cables, copper wire and fiber optics, including the wires that make up the bus 802. Transmission media also may also take the form of acoustic or light waves, such as those generated during radio wave and infrared data communications.

Various forms of computer readable media may be involved in carrying out one or more sequences of one or more instructions to processor 803 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the control system 801 may receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 804, from which the processor 803 retrieves and executes the instructions. The instructions received by the main memory 804 may optionally be stored on storage device 807 or 808 either before or after execution by processor 803.

The control system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be an Inter-Integrated Circuit (IIC) that facilitates various integrated circuits to communicate with each other. Alternatively, the communication interface 813 may be a network interface card to attach to any packet switched LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc). The signals through the various networks and the signals on the network link 814 and through the communication interface 813, which carry the digital data to and from the control system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The control system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

Although the present invention has been described in terms of exemplary embodiments, it is not limited thereto. Rather, the appended claims should be construed broadly to include other variants and embodiments of the invention which may be made by those skilled in the field of this art without departing from the scope and range of equivalents of the invention.

The invention claimed is:

1. An optical transmitter apparatus comprising:
   a heater; and
   a laser configured to have a center ambient wavelength offset from a center ambient wavelength of an operative band of the transmitter, and;
   a controller to operate the heater when an ambient temperature of the laser approaches, reaches, or exceeds a shifted lower temperature working range of the laser, where the shifted lower temperature range is set higher than a lower temperature range of a laser have a center ambient wavelength that is not offset from the center ambient wavelength of an operative band of the transmitter.

2. The apparatus of claim 1, the laser a CWDM laser.

3. The apparatus of claim 1, the laser a DFB laser.

4. The apparatus of claim 1, the laser having a center ambient wavelength offset by approximately 3 nm from the center ambient wavelength of the operative band of the transmitter.

5. The apparatus of claim 4, the controller to maintain the laser at an operative band of 1545 nm to 1549 nm.

6. The apparatus of claim 1, the controller to operate the heater when an ambient temperature of the laser approaches, reaches, or exceeds a lower temperature of −30 C.

7. A method of operating a laser in a cable television system, comprising:
   employing in an optical transmitter a laser having a center ambient wavelength offset from a center ambient wavelength of an operative band of the transmitter, and warming the laser when its temperature or the ambient temperature approaches, reaches, or exceeds a lower operating temperature or temperature range for the laser, where the lower operating temperature or temperature range is set higher than it would be if the laser had a center ambient wavelength that was not offset from the center ambient wavelength of the operative band of the transmitter.

8. An optical transmission system comprising:
   an optical transmitter comprising:
   a heater, and
   a laser configured to an operating band offset from an operating band of the transmitter, and;
   a controller to operate the heater when an ambient temperature of the laser approaches, reaches, or exceeds a shifted lower temperature working range of the laser, where the shifted lower temperature range is set higher than a lower temperature range of the laser if the laser were not offset from the operating band of the transmitter; and
   an optical receiver, the optical receiver configured to have an operating band of the transmitter.

9. An optical transmitter comprising a laser configured to have a center ambient wavelength offset from a center ambient wavelength of an operative band of the transmitter.

* * * * *